US010536534B2

(12) United States Patent
Brummet et al.

(10) Patent No.: US 10,536,534 B2
(45) Date of Patent: Jan. 14, 2020

(54) SYSTEM AND METHOD FOR PROVIDING VISUAL FEEDBACK IN SITE-RELATED SERVICE ACTIVITY ROADMAP

(71) Applicant: Honeywell International Inc., Morris Plains, NJ (US)

(72) Inventors: David J. Brummet, Anthem, AZ (US); Michael L. Witt, Lawrenceburg, IN (US); Dennis P. L. Belletti, London (CA); Shawn M. Gold, Richmond (CA)

(73) Assignee: Honeywell International Inc., Morris Plains, NJ (US)

( * ) Notice: Subject to any disclaimer, the term of this patent is extended or adjusted under 35 U.S.C. 154(b) by 326 days.

(21) Appl. No.: 15/199,446

(22) Filed: Jun. 30, 2016

(65) Prior Publication Data

US 2017/0054816 A1 Feb. 23, 2017

Related U.S. Application Data

(60) Provisional application No. 62/207,477, filed on Aug. 20, 2015, provisional application No. 62/207,482, (Continued)

(51) Int. Cl.
G06F 15/173 (2006.01)
H04L 29/08 (2006.01)
H04L 12/24 (2006.01)

(52) U.S. Cl.
CPC ............ *H04L 67/142* (2013.01); *H04L 41/22* (2013.01); *H04L 41/5038* (2013.01); *H04L 67/16* (2013.01)

(58) Field of Classification Search
CPC . H04L 41/22; H04L 41/5009; H04L 41/5032; H04L 43/045; H04L 29/08072;
(Continued)

(56) References Cited

U.S. PATENT DOCUMENTS 8,296,756 B1 10/2012 Feeser
8,560,504 B2 10/2013 Parker et al.
(Continued)

FOREIGN PATENT DOCUMENTS

JP 2006-508427 A 3/2006
WO 2004/034188 A2 4/2004

OTHER PUBLICATIONS

Notification of Transmittal of the International Search Report and the Written Opinion of the International Searching Authority, or the Declaration dated Dec. 20, 2016 in connection with International Patent Application No. PCT/US2016/047342.
(Continued)

*Primary Examiner* — Michael A Keller
*Assistant Examiner* — Thao D Duong

(57) ABSTRACT

A method includes obtaining information associated with a service provider's activities with respect to a computing system, where the service provider's activities include changes to the computing system. The method also includes identifying a specified time period and generating a graphical display containing a service roadmap. The service roadmap identifies one or more of the changes to the computing system that have occurred or will occur within the specified time period. The method further includes, in response to a user selection of one of the changes to the computing system in the service roadmap, updating the graphical display to include additional information about the selected change to the computing system. The characteristics of the service provider's activities could include multiple characteristics related to contractual requirements of a service agreement and multiple characteristics related to performance characteristics of computing devices and computing networks in the computing system.

15 Claims, 8 Drawing Sheets

Related U.S. Application Data filed on Aug. 20, 2015, provisional application No. 62/207,485, filed on Aug. 20, 2015, provisional application No. 62/207,488, filed on Aug. 20, 2015.

(58) Field of Classification Search
CPC ..... H04L 43/04; H04L 43/16; H04L 41/5045; H04L 41/0213; H04L 67/16; G06Q 10/06393; G06Q 30/02; G06Q 10/00; G06Q 10/06

See application file for complete search history.

(56) References Cited

U.S. PATENT DOCUMENTS

| | | | |
|---|---|---|---|
| 2003/0055749 A1* | 3/2003 | Carmody | G06Q 10/087 705/28 |
| 2004/0068431 A1 | 4/2004 | Smith et al. | |
| 2005/0114502 A1* | 5/2005 | Raden | G06F 11/3006 709/224 |
| 2006/0242606 A1* | 10/2006 | Lin | G06F 8/34 715/855 |
| 2007/0168874 A1* | 7/2007 | Kloeffer | G06F 8/65 715/764 |
| 2008/0184130 A1 | 7/2008 | Tien et al. | |
| 2008/0312986 A1 | 12/2008 | Braun et al. | |
| 2010/0121776 A1* | 5/2010 | Stenger | G06Q 10/06 705/347 |
| 2010/0123575 A1 | 5/2010 | Mittal et al. | |
| 2011/0172973 A1* | 7/2011 | Richards | G05B 23/0248 703/2 |
| 2012/0053979 A1 | 3/2012 | Nalawade | |
| 2012/0123822 A1 | 5/2012 | Hnatio | |
| 2013/0110589 A1 | 5/2013 | McCauley | |
| 2013/0282333 A1 | 10/2013 | Mast et al. | |
| 2013/0304905 A1 | 11/2013 | Appachiappan et al. | |
| 2013/0311229 A1* | 11/2013 | Hadar | G06Q 10/0635 705/7.28 |
| 2013/0332472 A1 | 12/2013 | Vogel et al. | |
| 2014/0236749 A1* | 8/2014 | Yang | G06Q 30/01 705/26.2 |
| 2015/0134593 A1 | 5/2015 | Ramesh et al. | |
| 2015/0187012 A1 | 7/2015 | Combes et al. | |

OTHER PUBLICATIONS

Notification of Transmittal of the International Search Report and the Written Opinion of the International Searching Authority, or the Declarations dated Nov. 25, 2016 in connection with International Application No. PCT/US2016/047287, 10 pages.

Notification of Transmittal of the International Search Report and the Written Opinion of the International Searching Authority, or the Declarations dated Nov. 21, 2016 in connection with International Application No. PCT/US2016/047317, 11 pages.

Dennis P.L. Belletti, et al., "System and Method for Providing High-Level Graphical Feedback Related to Overall Site Performance and Health", U.S. Appl. No. 15/199,660, filed Jun. 30, 2016, 42 pages.

David J. Brummet, et al., "System and Method for Providing Visualization of Performance Against Service Agreement", U.S. Appl. No. 15/199,840, filed Jun. 30, 2016, 43 pages.

Andrew Duca, "System and Method for Providing Multi-Site Visualization and Scoring of Performance Against Service Agreement", U.S. Appl. No. 15/199,806, filed Jun. 30, 2016, 43 pages.

* cited by examiner

Honeywell      News & Events   Resources   Channel Partners   About Us   Contact Us

HOME   EXPLORE   SUPPORT   TRAINING   MY ACCOUNT   ASSURANCE 360

My Reports: July 2015 — 604     606 — ⇧ Sunray - McKee Refinery ▼

Select Detail
- Phone Response Time
- Resolution Time
- Incident Reduction
- Security Patches
- Anti-Virus Updates
- Loop Tuning
- Alarm Rationalization
- Training Completed
- Successful Updates

Incident Reduction KPI
July 2015

Gauge: 90, 95, 100, 105, 110 — 110%

The percent reduction in the number of Customer reported incidents as compared to an established baseline number of incidents.

Incident Reduction History

Bar chart: 95%–100% across May 2015, Jun 2015, Jul 2015

Details

| SR Number | SR Summary | SR Creation | Site Contacted | Phone Response Time (Hrs.) |
|---|---|---|---|---|
| 1-193836729 | Low Battery Warning | 5/3/2015 10:42 AM | 5/3/2015 11:52 AM | 1.15 |

SYSTEM AND METHOD FOR PROVIDING VISUAL FEEDBACK IN SITE-RELATED SERVICE ACTIVITY ROADMAP

CROSS-REFERENCE TO RELATED APPLICATION AND PRIORITY CLAIM

This application claims priority under 35 U.S.C. § 119(e) to the following provisional applications:
U.S. Provisional Patent Application No. 62/207,477 filed on Aug. 20, 2015;
U.S. Provisional Patent Application No. 62/207,482 filed on Aug. 20, 2015;
U.S. Provisional Patent Application No. 62/207,485 filed on Aug. 20, 2015; and
U.S. Provisional Patent Application No. 62/207,488 filed on Aug. 20, 2015.
All of these provisional applications are hereby incorporated by reference in their entirety.

TECHNICAL FIELD

This disclosure relates generally to computing system maintenance. More specifically, this disclosure relates to a system and method for providing visual feedback in a site-related service activity roadmap.

BACKGROUND

Various organizations routinely have their own private computing systems, and some of these computing systems can easily include thousands and thousands of computing devices. These organizations typically want assurances that their computing systems and devices are running with correct versions of software, are configured correctly, are performing appropriately, and have adequate capacity. Some organizations have started looking to external agencies to provide such assurances, where these agencies enter into service agreements with the organizations. A service agreement often identifies specific goals for an organization's site and for the agency's performance in servicing that site.

SUMMARY

This disclosure provides a system and method for providing visual feedback in a site-related service activity roadmap.

In a first embodiment, a method includes obtaining information associated with a service provider's activities with respect to a computing system, where the service provider's activities include changes to the computing system. The method also includes identifying a specified time period and generating a graphical display containing a service roadmap. The service roadmap identifies one or more of the changes to the computing system that have occurred or will occur within the specified time period. The method further includes, in response to a user selection of one of the changes to the computing system in the service roadmap, updating the graphical display to include additional information about the selected change to the computing system.

In a second embodiment, an apparatus includes at least one processing device configured to obtain information associated with a service provider's activities with respect to a computing system, where the service provider's activities include changes to the computing system. The at least one processing device is also configured to identify a specified time period and generate a graphical display containing a service roadmap. The service roadmap identifies one or more of the changes to the computing system that have occurred or will occur within the specified time period. The at least one processing device is further configured, in response to a user selection of one of the changes to the computing system in the service roadmap, to update the graphical display to include additional information about the selected change to the computing system.

In a third embodiment, a non-transitory computer readable medium contains instructions that when executed cause at least one processing device to obtain information associated with a service provider's activities with respect to a computing system, where the service provider's activities include changes to the computing system. The medium also contains instructions that when executed cause the at least one processing device to identify a specified time period and generate a graphical display containing a service roadmap. The service roadmap identifies one or more of the changes to the computing system that have occurred or will occur within the specified time period. The medium further contains instructions that when executed cause the at least one processing device, in response to a user selection of one of the changes to the computing system in the service roadmap, to update the graphical display to include additional information about the selected change to the computing system.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:
FIGS. 5 through 8 illustrate example dashboards supporting visualization of performance against a service agreement and/or service roadmaps according to this disclosure.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As described above, many organizations typically want assurances that their computing systems and devices are running with correct versions of software, are configured correctly, are performing appropriately, and have adequate capacity. Some organizations have started looking to external agencies to provide such assurances, and these agencies can enter into service agreements with the organizations. However, an organization may also wish to obtain an ongoing overview representation of an agency's performance against the agency's service agreement, along with an ability to drill down into the details of the overview representation.

This patent document describes a system and method for providing visualization of performance against a service agreement. This patent document also describes a system and method for providing visualization of service roadmaps related to a service agreement. Note that in the following discussion, the systems and methods are described with respect to use in conjunction with an industrial process control and automation system. However, the systems and methods could be used with any suitable computing system and are not limited to use in industrial control and automation settings.

Figure 1:
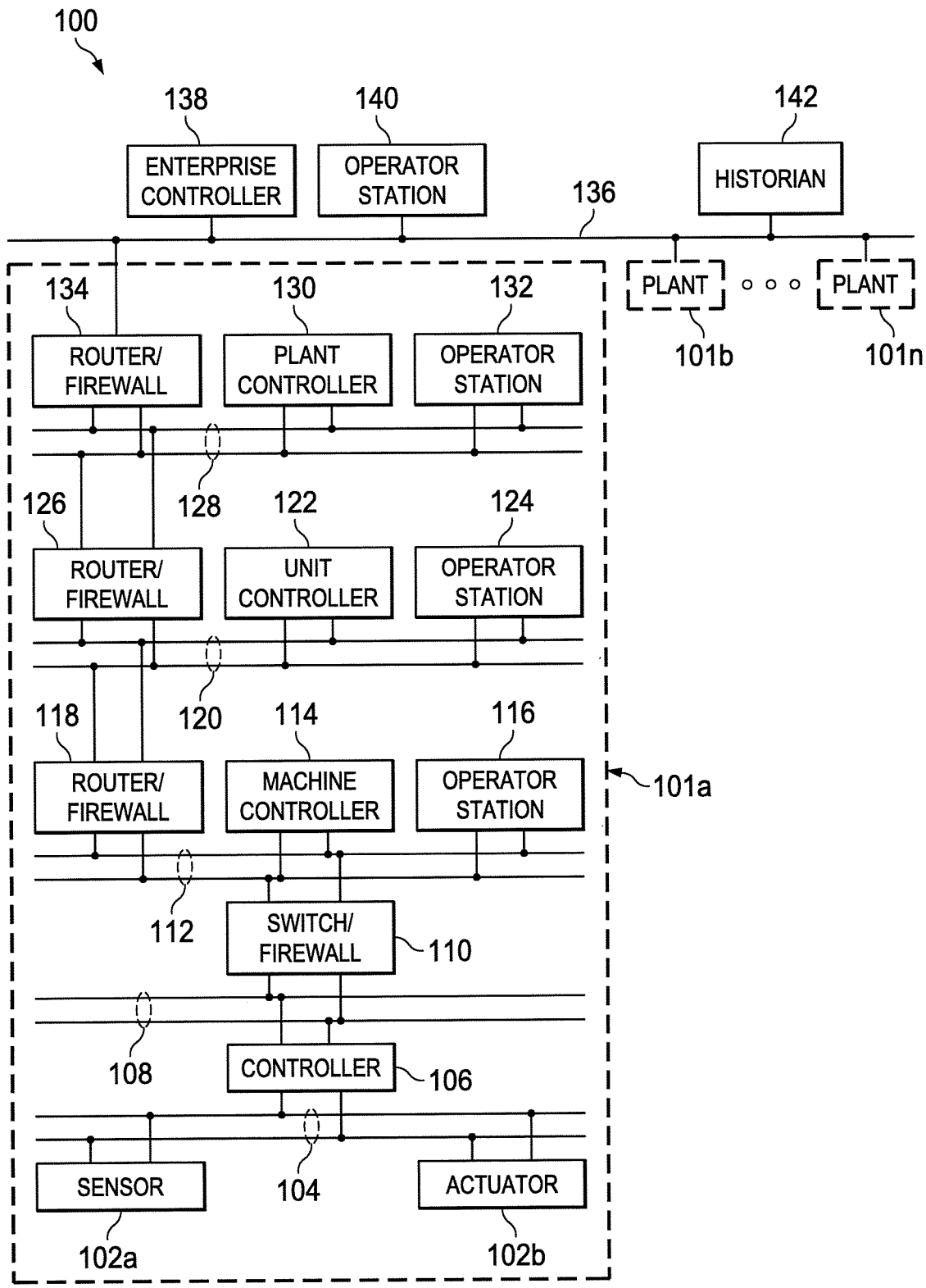
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

One or more networks 104 are coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, redundant IEC-61850, IEC-62439, Ethernet/IP (EIP), or MODBUS/TCP networks, or any other or additional type(s) of network(s). The network(s) 104 can have any suitable configuration, such as a parallel or ring topology.

In the Purdue model, "Level 1" includes one or more controllers 106, which are coupled to the network(s) 104. Among other things, each controller 106 may use the measurements from one or more sensors 102a to control the operation of one or more actuators 102b. Each controller 106 includes any suitable structure for controlling one or more aspects of a process system. As a particular example, each controller 106 could represent a computing device running a real-time operating system.

Redundant networks 108 are coupled to the controllers 106. The networks 108 facilitate interaction with the controllers 106, such as by transporting data to and from the controllers 106. The networks 108 could represent any suitable redundant networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

A historian 142 is also coupled to the network 136 in this example. The historian 142 could represent a component that stores various information about the system 100. The historian 142 could, for example, store information used during production scheduling and optimization. The historian 142 represents any suitable structure for storing and facilitating retrieval of information. Although shown as a single centralized component coupled to the network 136, the historian 142 could be located elsewhere in the system 100, or multiple historians could be distributed in different some of the data used to generIn one aspect of operation, an owner or operator of the In one aspect of operation, an owner or operator of the process control and automation system 100 could enter into a service agreement with an outside party (referred to as a "service provider") to maintain various computing devices within the system 100. The computing devices could include various process controllers, operator stations, switches, routers, firewalls, and other computing devices used in or with the system 100. However, the owner or operator of the system 100 often wants to know whether the service provider is complying with the terms of its service agreement.

As described below, the system 100 can include or be used in conjunction with at least one on-site service node, which can collect information about the system 100 or a portion thereof. The collected information can be transmitted to a management server, which uses the collected information to identify how well the service provider is complying with the terms of its service agreement. The management server can alternatively or additionally provide the owner or operator of the system 100 with information about past, present, or future service activities associated with the system 100. This information can be made available to the owner or operator of the system 100 and used in any suitable manner.

Although FIG. 1 illustrates one example of an industrial process control and automation system 100, various changes may be made to FIG. 1. For example, industrial control and automation systems come in a wide variety of configurations. The system 100 shown in FIG. 1 is meant to illustrate one example operational environment in which certain functionalities can be used. However, FIG. 1 does not limit this disclosure to any particular configuration or operational environment. Also, as noted above, the techniques described in this patent document could be used with any suitable computing system and are not limited to use with industrial process control and automation systems.

Figure 2:
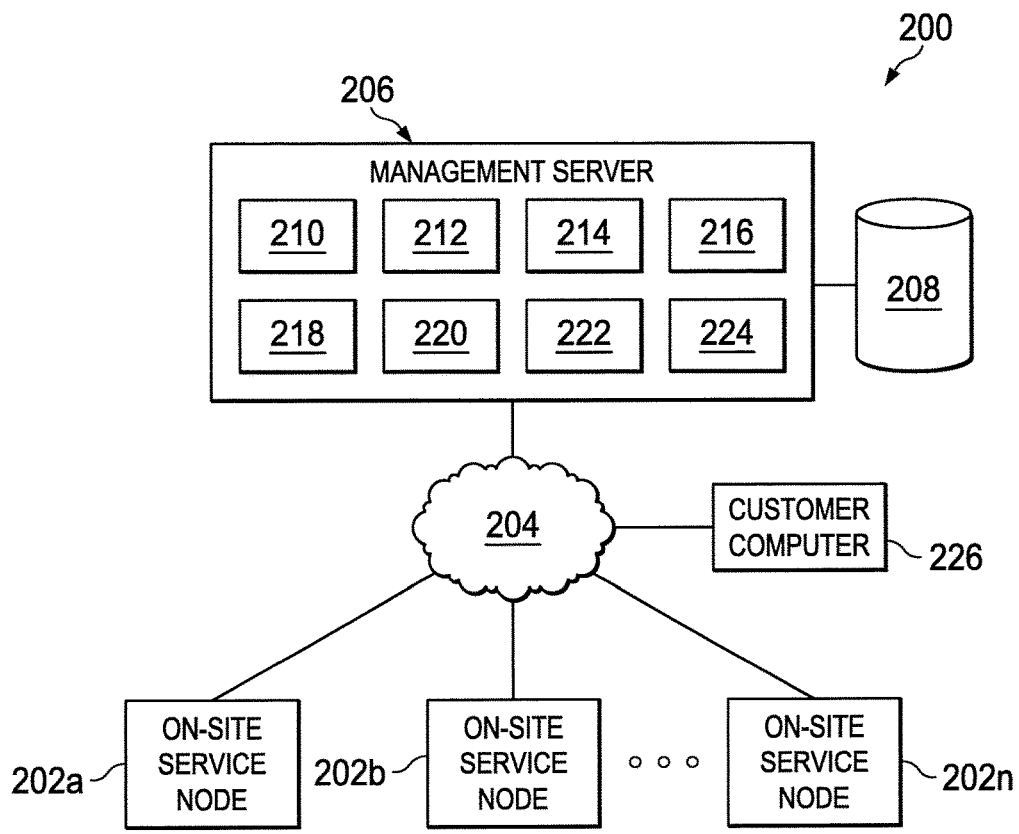
FIG. 2 illustrates an example system supporting analysis of performance against a service agreement and/or service roadmaps according to this disclosure.

FIG. 2 illustrates an example system 200 supporting analysis of performance against a service agreement and/or service roadmaps according to this disclosure. For ease of explanation, the system 200 is described as being used with the industrial process control and automation system 100 of FIG. 1. However, the system 200 could be used with any other suitable computing system(s) at one or more locations or sites.

As shown in FIG. 2, the system 200 includes one or more on-site service nodes 202*a*-202*n*. Each on-site service node 202*a*-202*n* collects information associated with a computing system (or portion thereof). For example, each on-site service node 202*a*-202*n* could collect information about computing devices within one or more plants 101*a*-101*n* in the system 100. The collected information could represent any suitable information useful in determining whether a service provider is providing adequate computing system maintenance or other service in compliance with a service agreement. Example types of information could include health, performance, and safety information associated with various computing devices or response and resolution times associated with problems experienced at the various computing devices.

Each on-site service node 202*a*-202*n* includes any suitable structure for collecting information, such as a desktop, laptop, or server computer. Also, each on-site service node 202*a*-202*n* could use any suitable technique for collecting information, such as polling individual computing devices within a monitored computing system for information or receiving scheduled or unscheduled publications of data from individual computing devices within a monitored computing system. Each on-site service node 202*a*-202*n* could also or alternatively receive data manually provided by one or more users. Each on-site service node 202*a*-202*n* could process the collected information prior to, during, or after storage.

The on-site service nodes 202*a*-202*n* transmit the collected (and possibly processed) information over a network 204 to a management server 206. The network 204 represents any suitable communication network or combination of communication networks. For example, the network 204 could denote a local area network, a wide area network, or a global network such as the Internet.

The management server 206 processes the information received from each on-site service node 202*a*-202*n* and provides various information to users. For example, the management server 206 could provide visualizations of service providers' performances against their service agreements. The management server 206 could also provide information about service activities by service providers in the form of roadmaps. Note that the management server 206 could perform these tasks for multiple computing systems (possibly owned or operated by different entities) or for a single computing system. The management server 206 can operate in conjunction with at least one database 208, which stores and facilitates retrieval of information used by the management server 206 to perform the functions described below.

The management server 206 can include various components that support the different functions of the management server 206. These components could be implemented in any suitable manner, such as by using hardware or a combination of hardware and software/firmware instructions. In some embodiments, each component could be implemented using one or more software routines executed by at least one processor of the management server 206. Note that while described separately, some or all of these components could be integrated into a single software package.

A "Customer Relationship Manager" component 210 can be used by personnel to provide information about service agreements between service providers and "customers" of the service providers (such as organizations having their own private computing networks). The component 210 can also be used by personnel to provide information about service requests made to the service providers by the customers. In addition, the component 210 could be used by personnel to provide information about important system and agreement milestones. Any suitable information about the service agreements and service requests could be recorded. In some embodiments, the component 210 supports the use of one or more forms that can be filled in by personnel. Note, however, that other approaches (such as automated parsing of service contracts or other information or data mining of service or maintenance databases) could be used to obtain data.

A data association component 212 is used to receive information (such as health, performance, and safety information) from the on-site service nodes 202*a*-202*n* and associate that information with various service agreements. For example, the component 212 can identify what information collected from the on-site service nodes 202*a*-202*n* is related to a given service agreement. This could be accomplished in any suitable manner, such as by using static or dynamic mappings of collected data to service agreements or by using various business rules provided to the component 212.

A key performance indicator (KPI) configuration component 214 supports the identification of default and site-specific KPIs, data sources for the KPIs, and how the KPIs are calculated. The KPIs represent specific characteristics of one or more services provided by one or more service providers. For ease of management or use, KPIs can be divided into different types or categories, such as "contract" KPIs (related to contractual requirements of a service agreement) and "performance" KPIs (related to performance characteristics of computing devices, computing networks, or other devices or systems).

As particular examples, the contract KPIs could include any of the following (individually or in any combination):
the average response time of a service provider by phone when incidents arise;

the average response time of a service provider in person when incidents arise;

the average resolution time of a service provider in resolving incidents;

the percentage of incidents actually resolved by a service provider;

the reduction in the number of incidents reported to a service provider;

the percentage of security patch updates completed by a service provider on-time;

the percentage of anti-virus updates completed by a service provider on-time;

the percentage of process controller loop tunings completed by a service provider on-time;

the percentage of alarm rationalizations completed by a service provider on-time;

the number of recordable injuries that occurred as a result of a service provider's actions (or failures to act);

the amount of customer training by a service provider; and the percentage of successful changes to a control plan implemented by a service provider.

As other particular examples, the performance KPIs could include any of the following (individually or in any combination):

one or more performance measures of personal computers serviced by a service provider;

one or more performance measures of process controllers serviced by a service provider;

one or more performance measures of local control networks (LCNs), universal control networks (UCNs), or other networks serviced by a service provider;

one or more performance measures of switches, routers, firewalls, or other network devices serviced by a service provider; and one or more performance measures of overall network security in computing networks serviced by a service provider.

The component 214 could support the definition of standard or non-standard or customer-specific KPIs. The component 214 could also support an ability for users to manually enter KPI data. For example, a number of KPIs could be developed and used for a particular customer or a group of customers in a specific industry. As particular examples, the following KPIs could be defined in relation to a Quality Control System (QCS) associated with a paper or other web-based manufacturing or processing system (individually or in any combination):

the percentage of time that all sensors of a web-based manufacturing or processing system had 100% static accuracy and repeatability (referred to as a measure of "measurement accuracy");

the percentage of time that a web-based manufacturing or processing system was operating and all control components were available for use (referred to as a measure of "system accuracy"); and the percentage of control loops in the web-based manufacturing or processing system identified as having "tuning issues" and for which corrective tuning recommendations have been provided (referred to as a measure of "performance monitoring").

An overall contract score configuration component 216 supports defining how individual KPIs contribute to an overall contract performance score. For example, the component 216 could collect information defining the importance or weight of each KPI and maximum/minimum values expected by the service provider's customer for each KPI. These values could be specified in any suitable manner, such as in a service agreement or information associated with a service agreement.

A KPI processing component 218 supports the use of collected information to identify both (i) individual scores for the individual KPIs and (ii) an overall contract score based on the individual KPI scores. For example, as described below, the component 218 can use information collected from the on-site service nodes 202a-202n to generate scores identifying how well a service provider is meeting each individual KPI. The component 218 can use those individual KPI scores and the definition of the overall contract performance score from the component 216 to generate an overall contract performance score for the service provider.

An online dashboard component 220 supports online interactions with service provider customers. For example, a customer could use a computing device 226 (such as a desktop, laptop, or tablet computer or smartphone) to obtain information from the component 220 via a web browser. As a particular example, the component 220 could provide a summary overview with an overall contract score for the service provider, information about individual KPIs for the service provider, and historical trends of past performance by the service provider. The component 220 could also provide the customer with the ability to drill into the details of the individual KPIs in order to obtain additional information about the KPIs or to identify why a score might be too high or too low.

The dashboard component 220 could be used to generate any suitable reports or other information for review by service providers, customers, or other personnel or entities. For example, in some embodiments, the dashboard component 220 can generate a report for a service provider's customer, where the report provides information about KPIs with trending over time and key contract milestones. Information presented in this report could include a clear indication of performance, such as a comparison against a goal or overall trend, for the KPIs associated with a specific contracted process. A customer could view the report or download a PDF or other version of the report on a device of his or her choosing.

In addition, the management server 206 includes a milestone configuration component 222 and a timeline configuration component 224. The milestone configuration component 222 can be used to define an upcoming site service activity. A site service activity denotes an activity to be performed by a service provider at a customer's site, such as a hardware or software upgrade involving the customer's equipment. The information associated with a service activity could include a name, description, date, and type of the service activity. A status of the service activity could also be included, such as whether the service activity is planned or completed. This information helps to define a "roadmap" showing the site service activities associated with a specific customer site or collection of sites. The timeline configuration component 224 can be used to define a time period of interest for the roadmap. For example, the timeline configuration component 224 could be used to identify whether a timeline in a roadmap includes a future timeframe (such as the coming year) and/or a past timeframe (such as the prior month). The online dashboard component 220 could be used to present a roadmap to a customer based on this information. The roadmap can present a summary overview of the service activities, provide the ability to drill into the details for each service activity, report the status of each activity, and record any relevant notes regarding the status of each activity.

Note that the management server 206 could support any number of additional functions as needed or desired. For example, the management server 206 could perform regular data backups of the data in the database 208, or the management server 206 could enforce access control restrictions to ensure data security and privacy. The management server 206 could also support the use of emails, text messages, or other notifications for informing users when data is available for review, such as via the dashboard component 220. The management server 206 could further support the ability to track which users are accessing the management server 206, what data those users are viewing, and how often the users are accessing the data. In addition, the management server 206 could support a feedback mechanism through which users can submit comments or questions to appropriate personnel, such as personnel of a service provider.

Although FIG. 2 illustrates one example of a system 200 supporting analysis of performance against a service agreement and/or service roadmaps, various changes may be made to FIG. 2. For example, as noted above, the management server 206 could process data associated with services provided for a single computing system or multiple computing systems, and the number of monitored computing systems affects the number of on-site service nodes used. Also, the management server 206 could include a subset of the components 210-224 depending on what functionality is desired in a given installation. As particular examples, the components 210-220 could be used when the roadmap functionality is not desired, or the components 220-224 could be used when the KPI analysis functionality is not desired. Another example change could include hosting some of the components of the system 200 on multiple computers. For instance, the data association component 212 and the KPI processing component 218 could be provided on one or more additional servers, where the computed KPIs from the additional servers are copied or moved to the database 208. In this example, there might be multiple instances of each component 212 and 218, with each instance running on a different device or system.

Figure 3:
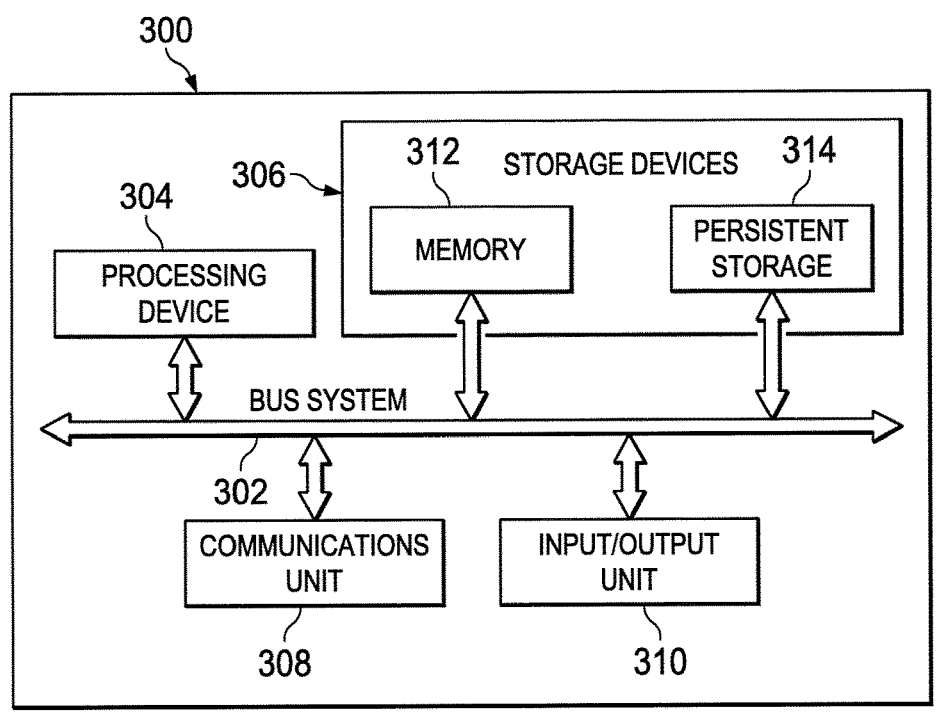
FIG. 3 illustrates an example device supporting analysis of performance against a service agreement and/or service roadmaps according to this disclosure.

FIG. 3 illustrates an example device 300 supporting analysis of performance against a service agreement and/or service roadmaps according to this disclosure. The device 300 could, for example, represent any suitable computing device in the system 100 of FIG. 1 or the system 200 of FIG. 2. For example, the device 300 could represent the on-site service nodes or the management server in FIG. 2.

As shown in FIG. 3, the device 300 includes a bus system 302, which supports communication between at least one processing device 304, at least one storage device 306, at least one communications unit 308, and at least one input/output (I/O) unit 310. The processing device 304 executes instructions that may be loaded into a memory 312. The processing device 304 may include any suitable number(s) and type(s) of processors or other devices in any suitable arrangement. Example types of processing devices 304 include microprocessors, microcontrollers, digital signal processors, field programmable gate arrays, application specific integrated circuits, and discrete circuitry.

The memory 312 and a persistent storage 314 are examples of storage devices 306, which represent any structure(s) capable of storing and facilitating retrieval of information (such as data, program code, and/or other suitable information on a temporary or permanent basis). The memory 312 may represent a random access memory or any other suitable volatile or non-volatile storage device(s). The persistent storage 314 may contain one or more components or devices supporting longer-term storage of data, such as a ready only memory, hard drive, Flash memory, or optical disc.

The communications unit 308 supports communications with other systems or devices. For example, the communications unit 308 could include a network interface card that facilitates communications over at least one Ethernet network. The communications unit 308 could also include a wireless transceiver facilitating communications over at least one wireless network. The communications unit 308 may support communications through any suitable physical or wireless communication link(s).

The I/O unit 310 allows for input and output of data. For example, the I/O unit 310 may provide a connection for user input through a keyboard, mouse, keypad, touchscreen, or other suitable input device. The I/O unit 310 may also send output to a display, printer, or other suitable output device.

The device 300 shown here can be used to implement any or all of the techniques described in this patent document. For example, the device 300 could analyze data in order to generate contract scores for services providers. The device 300 could also collect data and generate service activity roadmaps.

Although FIG. 3 illustrates one example of a device 300 supporting analysis of performance against a service agreement and/or service roadmaps, various changes may be made to FIG. 3. For example, various components in FIG. 3 could be combined, further subdivided, or omitted and additional components could be added according to particular needs. Also, computing devices can come in a wide variety of configurations, and FIG. 3 does not limit this disclosure to any particular configuration of computing device.

Figure 4:
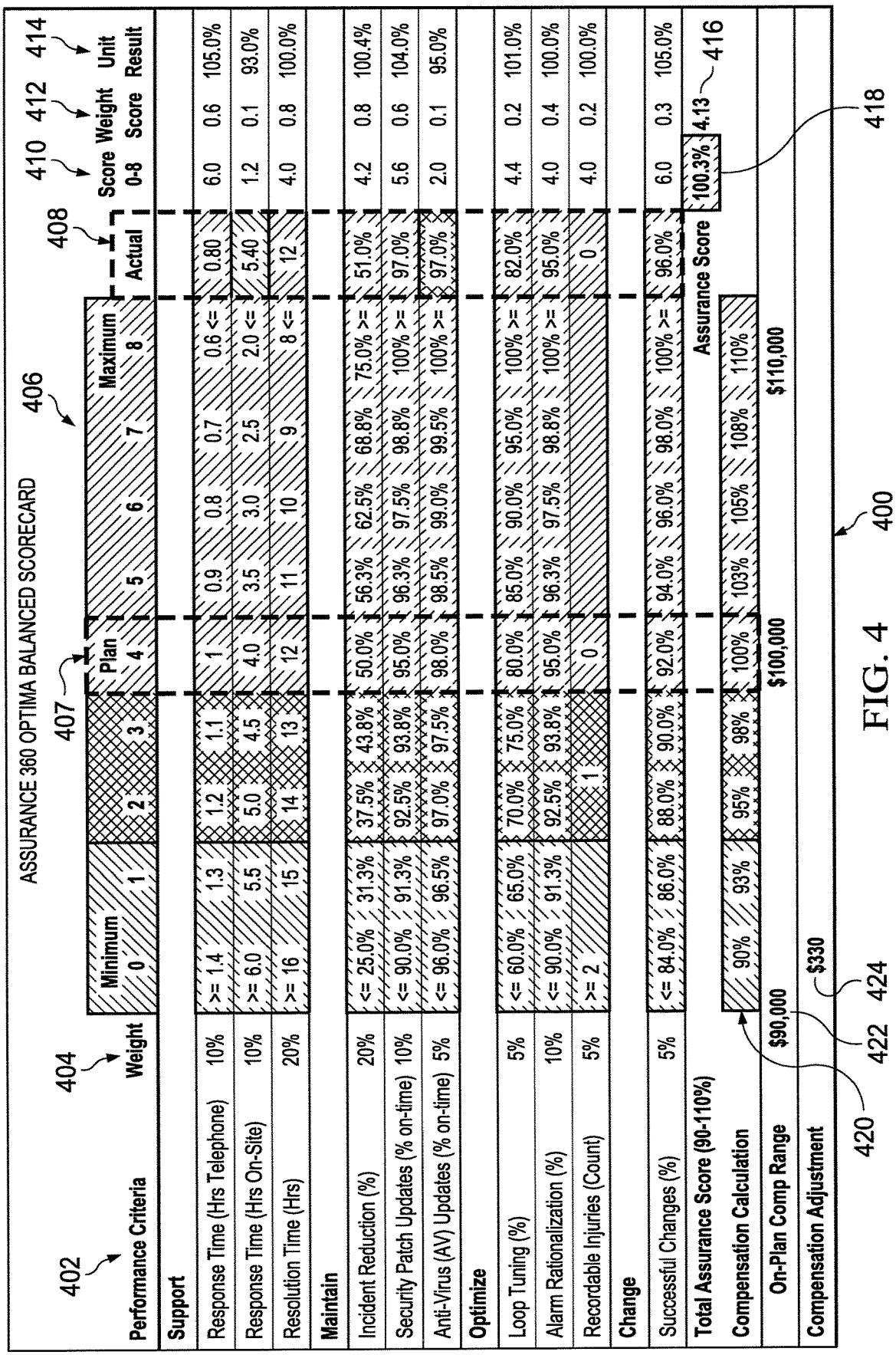
FIG. 4 illustrates an example report supporting visualization of performance against a service agreement according to this disclosure.

FIG. 4 illustrates an example report 400 supporting visualization of performance against a service agreement according to this disclosure. The report 400 could, for example, be generated by the management server 206 of FIG. 2 using data collected by one or more on-site service nodes 202a-202n of FIG. 2.

As shown in FIG. 4, the report 400 identifies a number of KPIs 402 being monitored for a service provider's customer. The KPIs are divided into different categories for ease of viewing. For each KPI 402, the report 400 identifies a weight 404 associated with that KPI. As noted above, the weight 404 for each KPI could be obtained from a service agreement, based on user input, or identified in any other suitable manner. The report 400 also includes a table 406 identifying different target values for each KPI. The specific KPI target for a particular customer can depend on the "plan" level selected and identified in the service agreement with that customer. The actual level for the customer is identified using a rectangular "PLAN" box 407 in FIG. 4.

For each KPI 402, the report 400 also identifies an actual "raw" value 408 for that KPI. The raw value 408 could be identified by the management server 206 based on data from one or more on-site service nodes 202a-202n, user input, or in any other suitable manner. Each raw value 408 denotes the actual value corresponding to one of the KPIs.

The raw value 408 of each KPI is used to calculate a raw score 410 for that KPI. In this example, each raw score 410 represents a value between one and eight, although other scoring ranges could be used. Any suitable scoring algorithm could be used to calculate the raw score 410 for a KPI. For example, in some embodiments, one of two calculations could be used to calculate a raw score 410—a first calculation type can be used when lower values are better (such as for resolution time), and a second calculation type can be used when higher values are better (such as for percentage of successful changes). A service agreement could specify the upper and lower values for each KPI, the weighting used for each KPI, and the calculation type to be used for each KPI. In particular embodiments, a raw score 410 could be calculated using the first calculation type as follows (e.g., Lower Bound=100 and Upper Bound=10):

```
If Raw Value >= Lower Bound
    Set Raw Score to 0
Else If Raw Value <= Upper Bound
    Set Raw Score to 8
Else
    Raw Score = |(Raw Value – Lower Bound) / (Upper Bound –
    Lower Bound)| * 8
```

Also, in particular embodiments, a raw score 410 could be calculated using the second calculation type as follows (e.g., Lower Bound=10 and Upper Bound=100):

```
If Raw Value <= Lower Bound
    Set Raw Score to 0
Else If Raw Value >= Upper Bound
    Set Raw Score to 8
Else
    Raw Score = |(Raw Value – Lower Bound) / (Upper Bound –
    Lower Bound)| * 8
```

For each KPI 402, the report 400 further identifies a weighted score 412, which is based on the weight 404 and the raw score 410 for that KPI. For example, the weighted score 412 could represent the product of the weight 404 and the raw score 410. In addition, for each KPI 402, the report 400 identifies an individual KPI score 414 for that KPI. The individual score 414 is based on the raw score 410 for that KPI. Any suitable scoring algorithm could be used to identify the individual KPI scores 414. For example, in some embodiments, an individual KPI score can be calculated as:

Individual KPI Score=((Raw Score)/8*20%)+90%

The weighted scores 412 for all KPIs can be summed to produce a total weighted score 416 in the report 400. The total weighted score 416 can be used to generate a total contract score 418. Any suitable scoring algorithm could be used to identify the total contract score 418. For example, in some embodiments, a total contract score can be calculated as:

Total Contract Score=((Total Weighted Score)/8*20%)+90%

The various information contained in the report 400 can be used in a variety of ways. For example, the total contract score 418 could be used to identify whether a customer owes additional payment to a service provider or is owed a refund from the service provider. As a particular example of this, the report 400 in FIG. 4 includes a range 420 of contract scores and an associated range 422 of service provider compensation. In this case, a contract score of 90% is associated with a compensation of $90,000, a contract score of 100% is associated with a compensation of $100,000, and a contract score of 110% is associated with a compensation of $110,000. The current plan for the customer is associated with a contract score of 100% and a compensation of $100,000. Since the calculated contract score 418 is slightly higher than the contracted contract score of 100%, the service provider may be entitled to a compensation adjustment 424 of $330 (which equals the actual contract score minus the contracted contract score, multiplied by the contracted compensation). If the calculated contract score 418 was lower than the contracted contract score, the same type of calculation could be used to identify a refund owed to the customer by the service provider.

Various values in the report 400 can also be highlighted using different colors or otherwise coded using different indicators. For example, different columns in the table 406 could be associated with different colors, such as green (better values), yellow (intermediate values), and red (poorer values). Similarly, each of the raw values 408 and the total contract score 418 could be associated with different colors, such as green (better values), yellow (intermediate values), and red (poorer values). This could allow, for example, a user to easily view the highlighted color for the "PLAN" box 407 and compare that color to the highlighted color(s) of the raw values 408 and the total contract score 418 to quickly determine which values (if any) are above or below the desired service level.

FIGS. 5 through 8 illustrate example dashboards supporting visualization of performance against a service agreement and/or service roadmaps according to this disclosure. The dashboards could, for example, be generated by the management server 206 of FIG. 2 using data collected by one or more on-site service nodes 202a-202n of FIG. 2.

Figure 5:
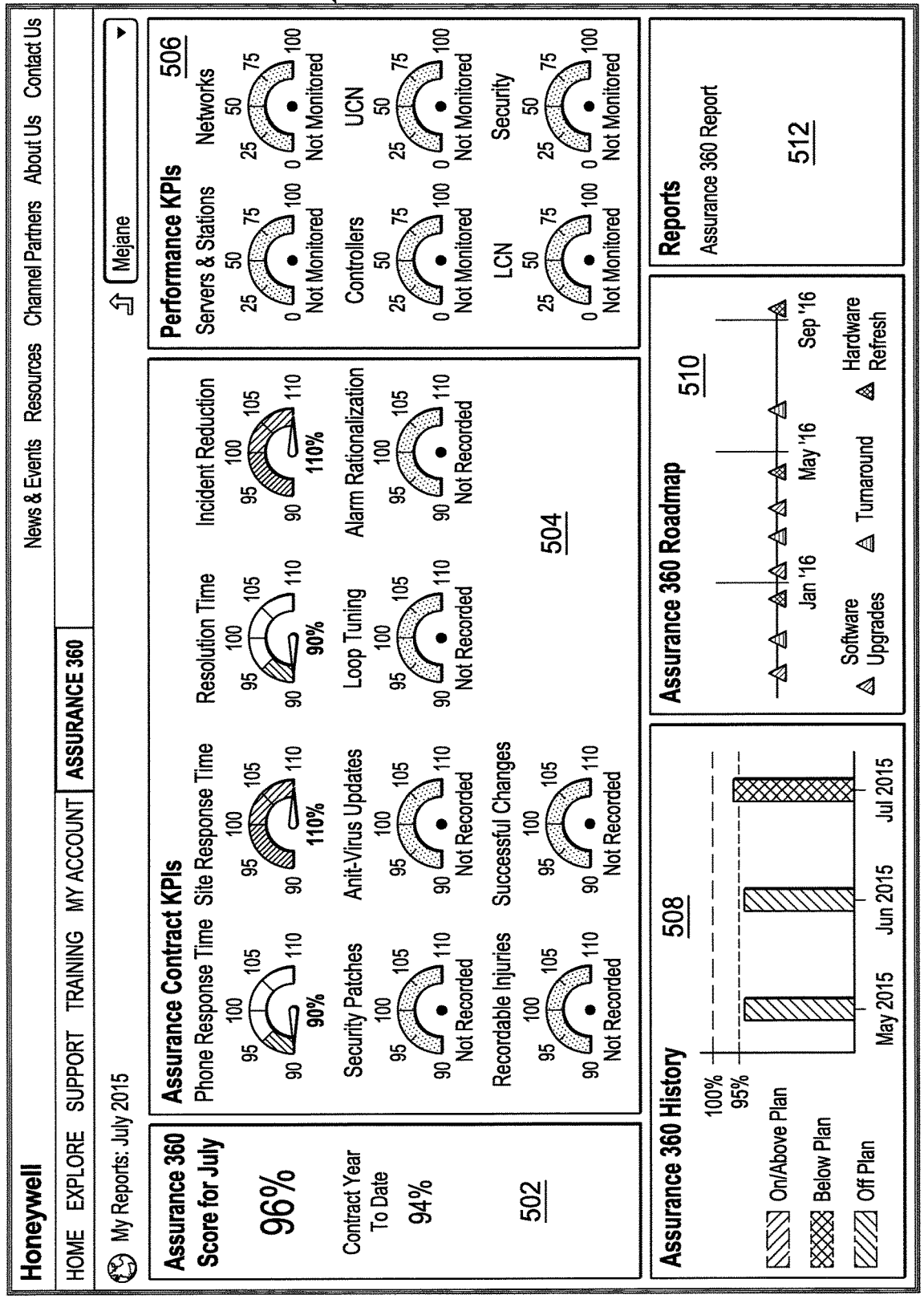

As shown in FIG. 5, a dashboard 500 includes a section 502 identifying current and year-to-date total contract scores, each of which could be calculated as described above with respect to the total contract score 418 using different data sets. Each score could be color-coded or otherwise coded based on how the score compares against one or more target values (such as a contracted value).

The dashboard 500 also includes sections 504-506 identifying individual KPI scores (which could be calculated as described above with respect to the individual KPI scores 414) for different KPIs in different categories. Here, the categories include contract and performance KPIs, although other or additional types of KPIs could also be used. Each KPI is associated with a "gauge" display, where the gauge identifies a name of the associated KPI. Assuming the associated KPI is monitored, its gauge identifies a KPI score for the associated KPI, and the KPI score is plotted within a range of values extending from a minimum value (on the left) to a maximum value (on the right). The minimum and maximum values could be specified in a service agreement. The KPI score is also identified by a numerical value, and a visual "needle" is provided pointing to the KPI score within the range of values.

The dashboard 500 further includes a trend section 508 identifying the trend of the total contract score over time. The length of time in the trend could be configurable by a user. The trend section 508 could be color-coded or otherwise coded based on how each score in the trend compares against one or more target values (such as a contracted value).

The dashboard 500 also includes a roadmap section 510, which identifies past, present, and/or future service plans for the customer's site. The roadmap section 510 is shown in greater detail in FIG. 7, which is described below.

In addition, the dashboard 500 includes a links section 512, which could be used to provide one or more hyperlinks to a user. The hyperlinks could be selected by the user to view additional information. For example, the links section 512 could include a link to a remote monitoring report or other detailed report showing how the total contract scores and the individual KPI scores were calculated. This could allow a user to "drill down" into a more detailed report to learn how a particular score was calculated.

In FIG. 5, color or other graphical mechanisms can be used to code different values for visual feedback. For example, the scores in the section 502 can be colored differently depending on whether the calculated total contract score exceeds the target score from a service agreement. As another example, the gauges in the sections 504-506 can be colored differently depending on whether the individual KPI scores are above or below a contracted level and to what extent. In addition, different bars in the graph shown in the section 508 can be colored differently depending on whether a score was above or below a contracted level and to what extent.

If a user selects any of the gauges shown in the sections 504-506 or otherwise indicates a desire to "drill down" into the individual KPIs shown in the dashboard 500, a dashboard 600 as shown in FIG. 6 can be presented to the user. As shown in FIG. 6, the dashboard 600 includes a KPI selection section 602, which lists the individual KPIs available for inspection. Based on the user's selection of a particular KPI in the dashboard 500 or the KPI selection section 602, a section 604 of the dashboard 600 provides the gauge for the selected KPI and an explanation of what that KPI represents. The dashboard 600 also provides a trend section 606 showing the value of the selected KPI over time and how the value of the selected KPI compares to one or more threshold values. The length of time in the trend diagram could be set in any suitable manner, such as based on user input. In addition, the dashboard 600 provides a details section 608, which presents at least some of the data on which the selected KPI's score is based.

Note that the upper and lower limits used by the gauges in the sections 504, 506, 604 could be set based on contracted levels in a service agreement. The specific regions between the upper and lower limits where the colors change in the gauges could be set in any suitable manner, such as based on the service agreement.

The following represents one specific example of how the dashboards 500-600 could be used by a customer. The dashboard 500 could be presented to a user, and the user could view the gauges in the sections 504-506. Upon seeing one gauge that appears to show inadequate service being rendered with respect to one KPI, the user could select that gauge and view a history of that KPI in the dashboard 600. The dashboard 600 could, among other things, provide a list of items used to calculate a particular score for that KPI. A link in the links section 512 could give the user an option to send a message to an administrator or other personnel at a service provider and provide comments about that particular KPI.

Figure 7:
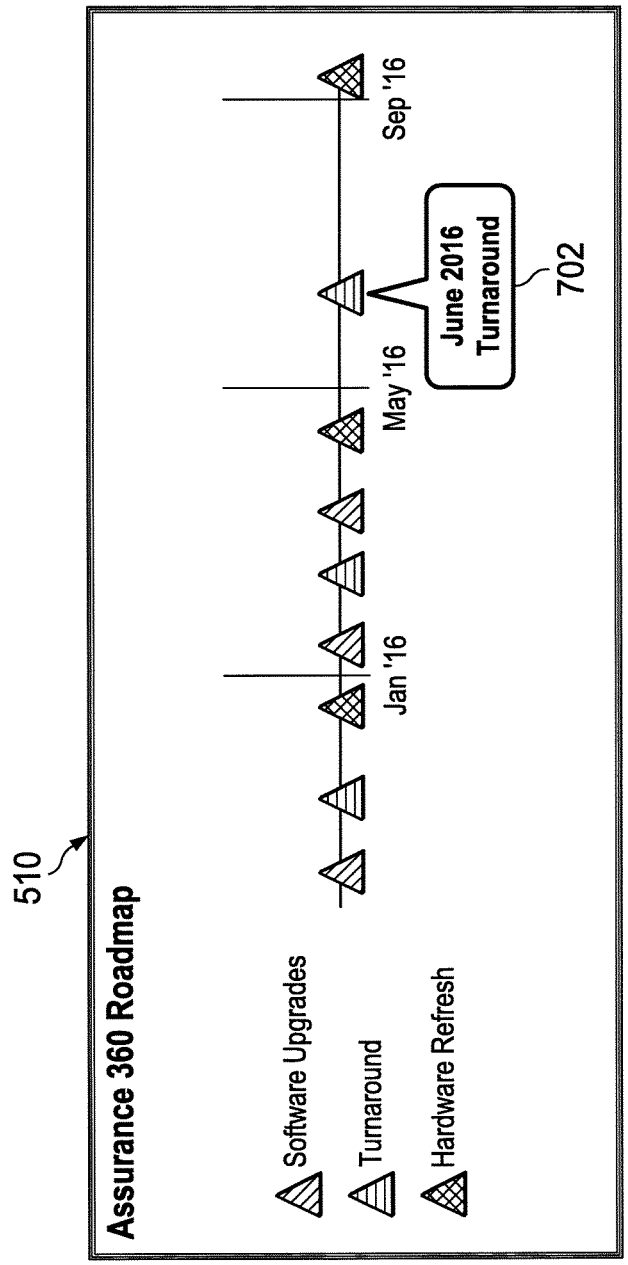

FIG. 7 illustrates an enlarged view of the roadmap section 510 from FIG. 5. As noted above, the roadmap section 510 identifies service plans for a customer's site. As can be seen in FIG. 7, the roadmap section 510 provides a visual representation of key planned service activities or milestones within a timeline. The timeline includes representations for different activity types, such as software upgrades, turnarounds, and hardware refreshes. If desired, a representation of the current status for each activity could be provided, such as whether the activity is planned, completed, late, or on hold. When a user clicks on or otherwise selects the icon associated with one of the activities in the roadmap section 510, a popup box 702 can provide various information about the activity. In this example, the popup box 702 identifies the type of activity and the scheduled date for the activity.

The user could also choose to further drill down on each activity in order to obtain additional details regarding the activity. This could occur, for example, if the user clicks on or otherwise selects a location within the popup box 702. The additional details could include a name, description, date, type, and status of the activity. The additional details could also include any notes regarding the status of the activity.

The dashboard 500 shown here could represent the scores associated with a single customer site, in which case the total contract scores and the individual KPI scores can be based on a service provider's activities with respect to the single customer site. However, the dashboard 500 could be easily expanded to represent the scores associated with multiple sites for a customer. In that case, the total contract scores and the individual KPI scores could be based on some combination of scores (such as average scores) associated with a service provider's activities for more than one site. For example, the section 502 could identify current and year-to-date total contract scores across all sites.

Also, an additional section or controls could be added allowing a user to select an individual customer site. Selection of one of the individual sites could provide the contents shown in the sections 504-512 of FIG. 5, allowing users to drill into the individual sites' KPI scores. Moreover, links can be provided that allow users to view detailed reports explaining how different sites' KPIs contributed to the overall multi-site contract score.

Figure 8:
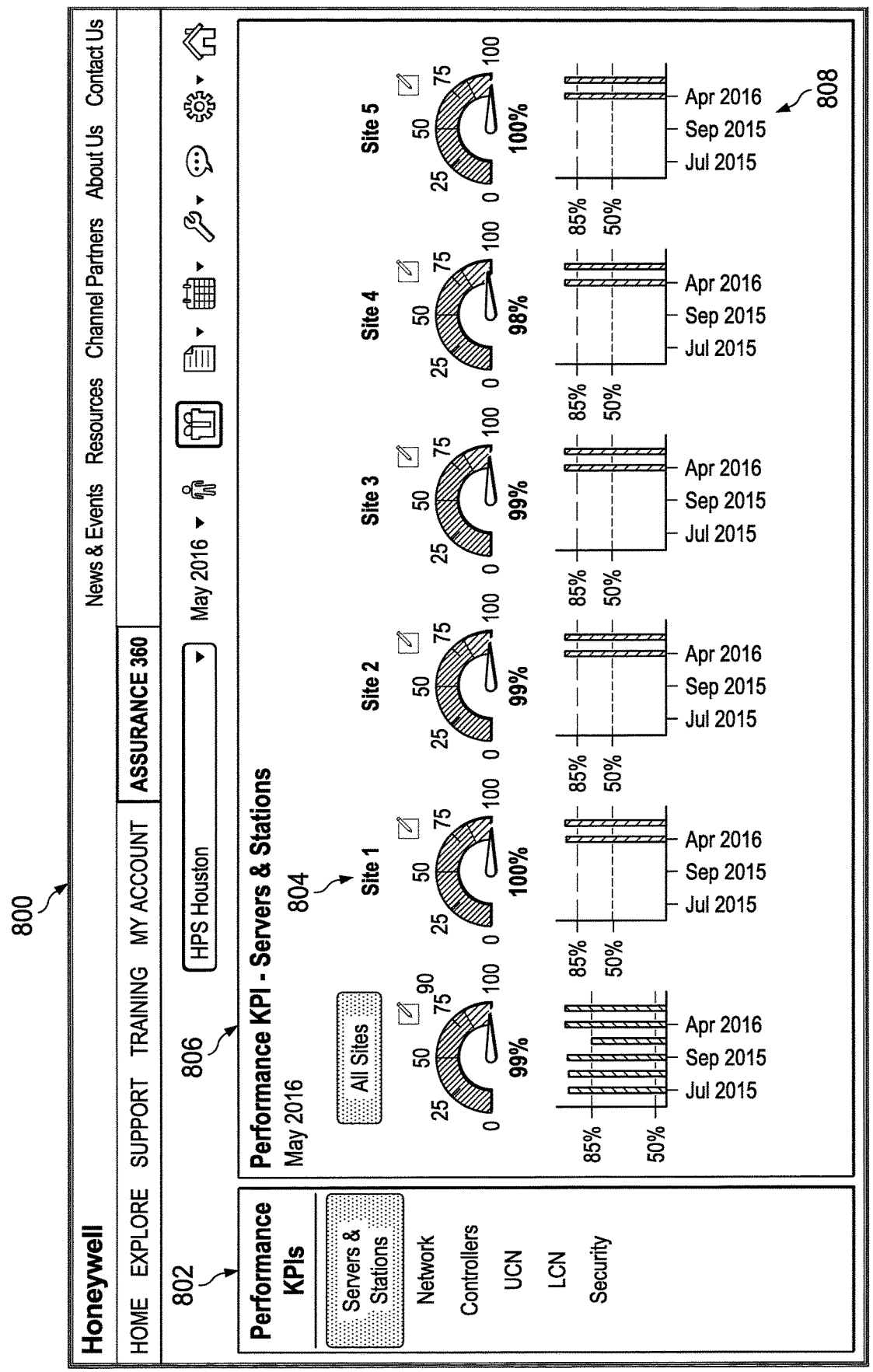

An example of this is shown in FIG. 8, where a dashboard 800 presents scores associated with multiple sites. As shown in FIG. 8, the dashboard 800 includes a section 802 identifying different KPIs that could be selected by a user. In this example, the KPIs are all "performance" KPIs, although as noted above other or additional types of KPIs could also be supported.

The dashboard 800 also includes a site selection bar 804 and a score section 806. The score section 806 includes various graphical representations 808 that graphically identify KPI scores. The graphical representations 808 include the gauges and the trends described above. Color-coding or otherwise coding could be used based on how a score compares against one or more target values (such as a contracted value). As noted above, a user could select one of the graphical representations 808 to obtain additional information about a selected KPI, such as at least some of the data used to generate the KPI score.

The site selection bar 804 allows a user to view the KPI scores for a collection of sites or for individual sites. In this case, the user has selected all sites, so the graphical representations 808 could denote the KPI scores across all sites. Selecting an individual site in the site selection bar 804 would cause the graphical representations 808 to show the KPI scores for that specific site.

Although FIGS. 4 through 8 illustrate one example of a report supporting visualization of performance against a service agreement and one example of a dashboard supporting visualization of performance against a service agreement and/or service roadmaps, various changes may be made to FIGS. 4 through 7. For example, the contents and arrangements of information in the report and dashboard are for illustration only. Also, the visualization of performance against a service agreement and the use of service roadmaps are not required to be done together. The visualization of performance against a service agreement can occur within a report or dashboard without use of a service roadmap, or vice versa. In addition, while certain graphical elements (such as gauges, bars, and popup boxes) are shown in the dashboards 500 and 600, any of a wide variety of graphical elements could be used to graphically represent the data.

Figure 9:
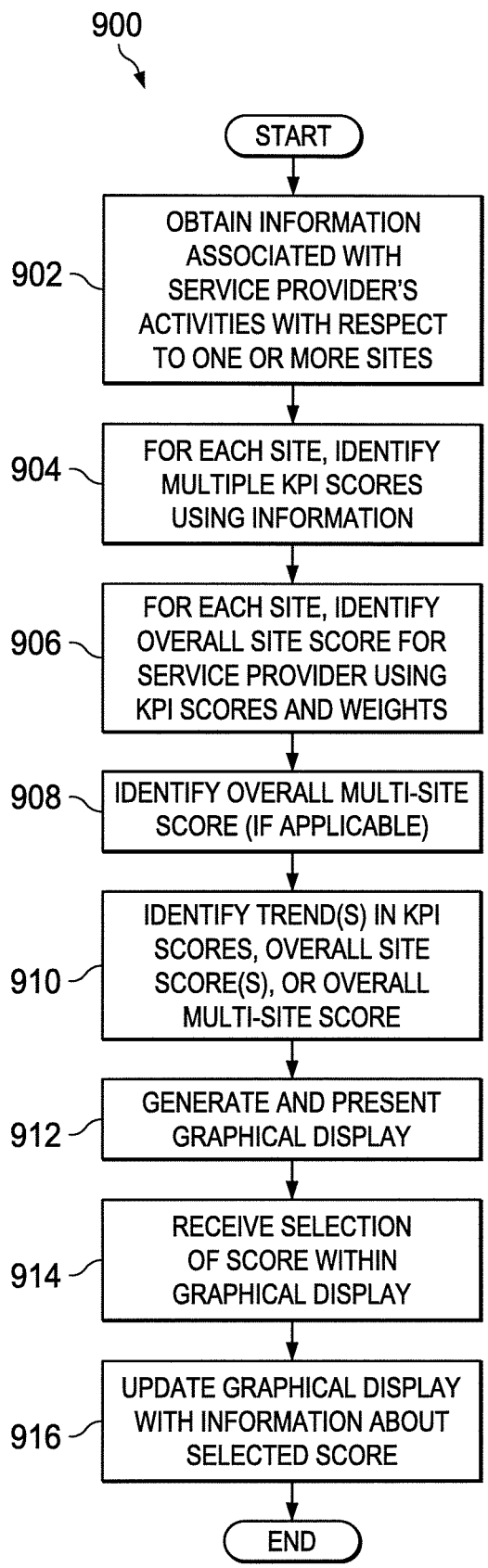
FIGS. 9 and 10 illustrate example methods supporting visualization of performance against a service agreement and/or service roadmaps according to this disclosure.
Figure 10:
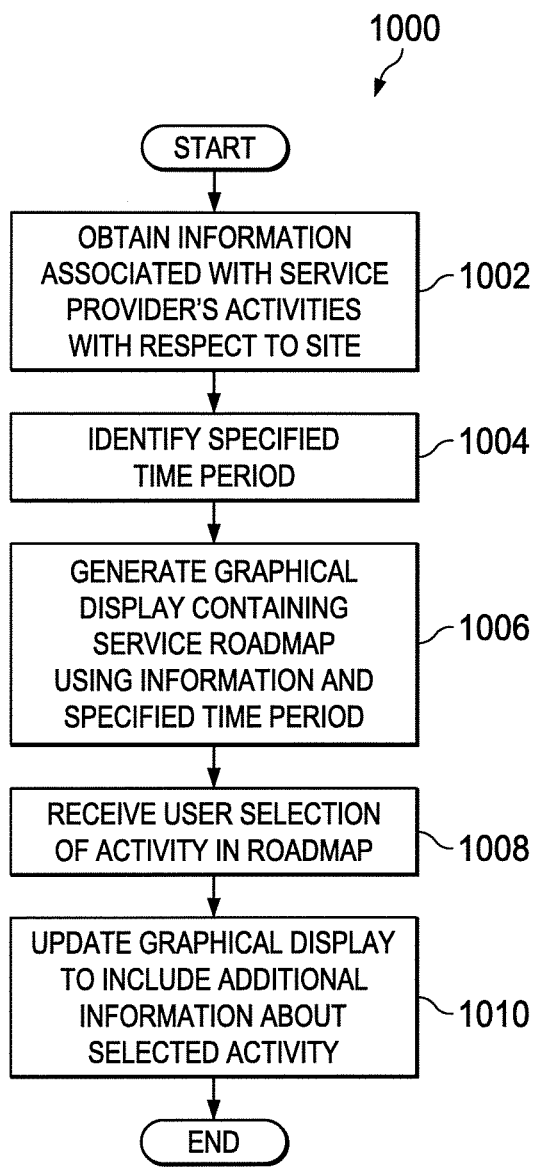

FIGS. 9 and 10 illustrate example methods supporting visualization of performance against a service agreement and/or service roadmaps according to this disclosure. For ease of explanation, FIGS. 9 and 10 are described with respect to the management server 206 of FIG. 2 implemented as shown in FIG. 3. However, the methods of FIGS. 9 and 10 could be performed using any suitable device and in any suitable system.

As shown in FIG. 9, a method 900 supports visualization of performance against a service agreement. Information associated with a service provider's activities with respect to one or more computing systems at one or more sites is obtained at step 902. This could include, for example, the processing device 304 of the management server 206 obtaining information about the service provider's contract(s) and the service provider's activities from one or more users, from an automated system that collects information about the service provider, or from any other suitable source(s).

For each site, multiple KPI scores are identified using the information at step 904. This could include, for example, the processing device 304 of the management server 206 calculating individual KPI scores for contract KPIs, performance KPIs, or other KPIs. As noted above, each KPI could be calculated in any suitable manner, such as by using one technique when higher scores are better and another technique when lower scores are better. Also, for each site, an overall site score for that site is identified using the KPI scores and weights for that site at step 906. This could include, for example, the processing device 304 of the management server 206 calculating an overall site score by summing multiple products, where each product denotes the result of multiplying one of the KPI scores and the weight of that KPI score.

If applicable, an overall multi-site score is identified at step 908. This could include, for example, the processing device 304 of the management server 206 calculating an overall multi-site score as a sum or average of multiple overall site scores. Note that weightings could also be used with the overall site scores, such as by assigning higher weights to more important sites. One or more trends are identified at step 910. This could include, for example, the processing device 304 of the management server 206 identifying changes over time for one or more KPIs, one or more overall site scores, or the overall multi-site score. A graphical display is generated and presented to at least one user at step 912. This could include, for example, the processing device 304 of the management server 206 generating a report or dashboard containing one or more KPI scores, overall site scores, overall multi-site scores, or trends. As a particular example, this could include the processing device 304 of the management server 206 generating a report in the form shown in FIG. 4 or a dashboard with gauges in the form shown in FIG. 5.

A selection of a score is received at step 914. This could include, for example, the processing device 304 of the management server 206 detecting a user's selection of a particular KPI score, overall site score, or overall multi-site score. The graphical display is updated with information about the selected score at step 916. This could include, for example, the processing device 304 of the management server 206 updating the dashboard to include information about the selected score, such as one or more trends involving the selected score or data used to generate the selected score.

As shown in FIG. 10, a method 1000 supports visualization of service roadmaps associated with a service agreement. Information associated with a service provider's activities with respect to at least one site having at least one computing system is obtained at step 1002. This could include, for example, the processing device 304 of the management server 206 obtaining information about the service provider's contract(s) and the service provider's activities from one or more users, from an automated system that collects information about the service provider, or from any other suitable source(s). The activities can include prior, current, or future activities.

A specified time period is identified at step 1004. This could include, for example, the processing device 304 of the management server 206 receiving user input identifying a custom time period or accessing data identifying a default time period. The time period could encompass any suitable previous time period or future time period. A graphical display is generated containing a service roadmap at step 1006. This could include, for example, the processing device 304 of the management server 206 generating a roadmap identifying the service provider's past, current, or future activities related to the site(s), such as activities that result in changes being made to the computing system(s) at the site(s).

A selection of an activity is received at step 1008. This could include, for example, the processing device 304 of the management server 206 detecting a user's selection of a particular activity in the service roadmap. The graphical display is updated with information about the selected activity at step 1010. This could include, for example, the processing device 304 of the management server 206 updating the dashboard to include information about the selected activity, such as the type of activity and the scheduled date for the activity.

Although FIGS. 9 and 10 illustrate examples of methods 900 and 1000 supporting visualization of performance against a service agreement and/or service roadmaps, various changes may be made to FIGS. 9 and 10. For example, while each figure shows a series of steps, various steps in each figure could overlap, occur in parallel, occur in a different order, or occur any number of times.

The approaches described above can help to provide technical solutions to various technical problems, such as in the field of computer and network management. For example, computing systems can include a large number of devices, making it extremely difficult or impractical for users to ensure that the computing devices are being managed or serviced properly. The lack of effective oversight means the users cannot tell how well the computing devices are being managed or serviced. For some devices (such as conventional computers), this could allow the devices to remain vulnerable to malware or other cyber-security threats. For other devices (such as process control and automation devices), this could allow the devices to provide less than optimal or even undesirable process control and automation functionality. The approaches described in this patent document help users to verify that their devices are being managed and serviced at an appropriate level much more easily compared to conventional approaches.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining information associated with a service provider's activities with respect to a computing system, the service provider's activities including changes to the computing system;
   identifying a specified time period, the specified time period including a prior timeframe and a future timeframe;
   generating a graphical display containing a service roadmap, the service roadmap identifying one or more of the changes to the computing system that have occurred or will occur within the specified time period;
   obtaining information for a service agreement between the service provider and a customer of the service provider;
   dynamically mapping the obtained service agreement to identify how well the service provider is complying with the terms of the service agreement;
   in response to a user selection of one of the changes to the computing system in the service roadmap, updating the graphical display to include additional information about the selected change to the computing system, wherein the service roadmap identifies different types of changes to the computing system, the different types of changes including software upgrades, turnarounds, and hardware refreshes;
   identifying multiple key performance indicator (KPI) scores using the information, the KPI scores associated with different characteristics of the service provider's activities with respect to the computing system; and
   identifying an overall score for the service provider using the KPI scores and weights associated with the KPI scores, wherein the overall score is based on at least one of:
      one or more performance measures of the computing system serviced by the service provider;
      one or more performance measures of process controllers serviced by the service provider;
      one or more performance measures of local control networks (LCNs), universal control networks (UCNs), or other networks serviced by the service provider;
      one or more performance measures of switches, routers, firewalls, or other network devices serviced by the service provider; and
      one or more performance measures of overall network security in computing networks serviced by the service provider.

2. The method of claim 1, wherein the service roadmap further identifies a status of each of the one or more changes to the computing system, each status being one of planned, completed, late, or on hold.

3. The method of claim 1, wherein the additional information includes a name of the selected change, a description of the selected change, a date of the selected change, and a type of the selected change.

4. The method of claim 3, wherein the additional information further includes at least one of:
   a status of the selected change; and
   a note regarding the selected change.

5. The method of claim 1, wherein:
   the graphical display further contains at least one of: the overall score and one or more of the KPI scores.

6. An apparatus comprising:
at least one processing device configured to:
- obtain information associated with a service provider's activities with respect to a computing system, the service provider's activities including changes to the computing system;
- identify a specified time period, the specified time period including a prior timeframe and a future timeframe;
- generate a graphical display containing a service roadmap, the service roadmap identifying one or more of the changes to the computing system that have occurred or will occur within the specified time period;
- obtain information for a service agreement between the service provider and a customer of the service provider;
- dynamically map the obtained service agreement to identify how well the service provider is complying with the terms of the service agreement;
- in response to a user selection of one of the changes to the computing system in the service roadmap, update the graphical display to include additional information about the selected change to the computing system, wherein the service roadmap identifies different types of changes to the computing system, the different types of changes including software upgrades, turnarounds, and hardware refreshes,
- identify multiple key performance indicator (KPI) scores using the information, the KPI scores associated with different characteristics of the service provider's activities with respect to the computing system; and
- identify an overall score for the service provider using the KPI scores and weights associated with the KPI scores, wherein the overall score is based on at least one of:
  - one or more performance measures of the computing system serviced by the service provider;
  - one or more performance measures of process controllers serviced by the service provider;
  - one or more performance measures of local control networks (LCNs), universal control networks (UCNs), or other networks serviced by the service provider;
  - one or more performance measures of switches, routers, firewalls, or other network devices serviced by the service provider; and
  - one or more performance measures of overall network security in computing networks serviced by the service provider.

7. The apparatus of claim 6, wherein the service roadmap further identifies a status of each of the one or more changes to the computing system, each status being one of planned, completed, late, or on hold.

8. The apparatus of claim 6, wherein the additional information includes a name of the selected change, a description of the selected change, a date of the selected change, and a type of the selected change.

9. The apparatus of claim 8, wherein the additional information further includes at least one of:
- a status of the selected change; and
- a note regarding the selected change.

10. The apparatus of claim 6, wherein:
the graphical display further contains at least one of: the overall score and one or more of the KPI scores.

11. A non-transitory computer readable medium containing instructions that when executed cause at least one processing device to:
- obtain information associated with a service provider's activities with respect to a computing system, the service provider's activities including changes to the computing system;
- identify a specified time period, the specified time period including a prior timeframe and a future timeframe;
- generate a graphical display containing a service roadmap, the service roadmap identifying one or more of the changes to the computing system that have occurred or will occur within the specified time period;
- obtain information for a service agreement between the service provider and a customer of the service provider;
- dynamically map the obtained service agreement to identify how well the service provider is complying with the terms of the service agreement;
- in response to a user selection of one of the changes to the computing system in the service roadmap, update the graphical display to include additional information about the selected change to the computing system, wherein the service roadmap identifies different types of changes to the computing system, the different types of changes including software upgrades, turnarounds, and hardware refreshes;
- identify multiple key performance indicator (KPI) scores using the information, the KPI scores associated with different characteristics of the service provider's activities with respect to the computing system; and
- identify an overall score for the service provider using the KPI scores and weights associated with the KPI scores, wherein the overall score is based on at least one of:
  - one or more performance measures of the computing system serviced by the service provider;
  - one or more performance measures of process controllers serviced by the service provider;
  - one or more performance measures of local control networks (LCNs), universal control networks (UCNs), or other networks serviced by the service provider;
  - one or more performance measures of switches, routers, firewalls, or other network devices serviced by the service provider; and
  - one or more performance measures of overall network security in computing networks serviced by the service provider.

12. The non-transitory computer readable medium of claim 11, wherein the service roadmap further identifies a status of each of the one or more changes to the computing system, each status being one of planned, completed, late, or on hold.

13. The non-transitory computer readable medium of claim 11, wherein the additional information includes a name of the selected change, a description of the selected change, a date of the selected change, and a type of the selected change.

14. The non-transitory computer readable medium of claim 13, wherein the additional information further includes at least one of:
- a status of the selected change; and
- a note regarding the selected change.

15. The non-transitory computer readable medium of claim 11, further containing instructions that when executed cause the at least one processing device to:
wherein the graphical display further contains at least one of: the overall score and one or more of the KPI scores.

* * * * *